United States Patent
Parks et al.

(10) Patent No.: US 8,577,298 B2
(45) Date of Patent: Nov. 5, 2013

(54) MULTI-ELEMENT MAGNETIC RECEIVER FOR INTERFERENCE SUPPRESSION AND SIGNAL ENHANCEMENT

(75) Inventors: Thomas M. Parks, Hamilton, NY (US); Richard Wasiewicz, Tully, NY (US); David LeVan, Baldwinsville, NY (US)

(73) Assignee: Lockheed Martin Corporation, Bethesda, MA (US)

( * ) Notice: Subject to any disclaimer, the term of this patent is extended or adjusted under 35 U.S.C. 154(b) by 177 days.

(21) Appl. No.: 13/164,375

(22) Filed: Jun. 20, 2011

(65) Prior Publication Data
US 2012/0322385 A1 Dec. 20, 2012

(51) Int. Cl.
*H04B 1/00* (2006.01)
*H04B 15/00* (2006.01)

(52) U.S. Cl.
USPC .......................... 455/63.1; 455/63.4; 455/136

(58) Field of Classification Search
USPC .............................. 455/63.1, 63.4, 136, 562.1
See application file for complete search history.

(56) References Cited

U.S. PATENT DOCUMENTS

| | | | |
|---|---|---|---|
| 6,049,705 A | | 4/2000 | Xue |
| 6,404,379 B1 * | | 6/2002 | Yu et al. .......................... 342/80 |
| 2003/0125091 A1 * | | 7/2003 | Choi et al. ..................... 455/562 |
| 2008/0004078 A1 * | | 1/2008 | Barratt et al. ............. 455/562.1 |
| 2008/0174500 A1 | | 7/2008 | Turner |
| 2009/0181633 A1 | | 7/2009 | Molnar et al. |
| 2011/0106289 A1 | | 5/2011 | Efendic et al. |

OTHER PUBLICATIONS

International Search Report dated Oct. 18, 2012 for related International Application PCT/US12/42497.
"Maximal-ratio combining" Wikipedia, The Free Encyclopedia. Wikimedia Foundation, Inc. Feb. 12, 2011. Web. Printed Jan. 11, 2012.
"Direction finding" Wikipedia, The Free Encyclopedia. Wikimedia Foundation, Inc. Jan. 8, 2012. Web. Printed Jan. 11, 2012.
Thiele, G.A. "Electromagnetic Direction Finding Techniques", Mar. 1975, Columbus, Ohio.
Curry, F.B. et al. "EM Rescue (Location) System for Deep Mines Phase II—Build and Test Breadboard Equipment", Oct. 1984, Sunnyvale, California.
Gordon, J. Untitled paper on direction finding. Fall, 2007. Web. http://www.ece.gatech.edu/academic/courses/ece4007/07fall/ece4007l02/group06/josh_trp.pdf.
RDF Products Page: "Mobile Adcock Radio Direction Finding Antennas", Web. http://www.rdfproducts.com/moblant.htm.

* cited by examiner

*Primary Examiner* — Tuan H Nguyen
(74) *Attorney, Agent, or Firm* — Howard IP Law Group, PC (57) ABSTRACT

A system and method for enhancing a magnetic communication signal is provided. A multi-element receiver is used to generate a plurality of input signals. A set of weights is generated using, for example, a calculated covariance of the plurality of input signals, and applied to the signals. The weights are used to generate a single output signal representing a weighted sum of the input signals.

21 Claims, 6 Drawing Sheets

*Fig. 6B* ic # MULTI-ELEMENT MAGNETIC RECEIVER FOR INTERFERENCE SUPPRESSION AND SIGNAL ENHANCEMENT

FIELD OF THE INVENTION

The present invention relates to magnetic communication systems, and more specifically magnetic communication receivers and methods for interference suppression and signal enhancement.

BACKGROUND

Underground communication systems, such as radio-frequency (RF) and magnetic signal based communication systems, are subject to noise and other types of interference which hinder their intended operation. For example, the orientation of the transmitter and/or the relative positions of the transmitter and the receiver can affect the direction and strength of the transmitted field with respect to the receiver. Likewise, the intervening medium, for example, the atmosphere, earth, as well as man-made obstructions, can affect the transmitted magnetic field at the receiver in ways that are difficult or impossible to predict.

These characteristics may be especially detrimental to the performance of magnetic communication systems which utilize directional antennas, such as systems used in direction finding operations. Direction finding is the process of determining the location of a transmission source (usually radio or magnetic-based). Critical applications for direction finding include emergency rescue operations in harsh operating conditions, for example, on or around mountains or in underground mines. As RF transmissions are typically less effective through materials such as earth and rock, magnetic field based communications are often preferred. However, as set forth above, magnetic communication systems are subject to inaccuracies and signal power reductions which make direction finding operations difficult.

Improved magnetic communication systems are desired.

SUMMARY

In one embodiment of the present invention, a method for enhancing a magnetic communication signal while simultaneously suppressing noise and interference is provided. The method includes receiving a magnetic communication signal with a plurality of antenna elements. The relative amplitudes of a plurality of received signals are measured, by, for example, generating a first covariance matrix corresponding to the communication signal as received by each of the antenna elements. A second covariance matrix corresponding to the noise and interference as received by each of the antenna elements may also be generated, inverted, and combined with the first covariance matrix. Principal components analysis may be applied to this combined matrix to calculate a set of weights that are used to generate a single output waveform comprising a weighted sum of the plurality of received input waveforms.

In a second embodiment of the present invention, a method for enhancing a magnetic communication signal is provided. The method includes receiving a magnetic communication signal with a plurality of antenna elements. The relative amplitudes of a plurality of received signals are measured, by, for example, generating a covariance matrix corresponding to the communication signal as received by each of the antenna elements. Principal components analysis may be applied to this matrix to calculate a set of weights that are used to generate a single output waveform comprising a weighted sum of the plurality of received input waveforms.

In a third embodiment of the present invention, a method for suppressing noise and interference in a magnetic communication system is provided. The method includes receiving noise and interference with a plurality of antenna elements in the absence of a transmitted magnetic communication signal. The relative amplitudes of a plurality of received waveforms are measured, by, for example, generating a covariance matrix corresponding to the noise and interference as received by each of the antenna elements. Principal components analysis may be applied to the inverse of this matrix to calculate a set of weights that are used to generate a single output waveform comprising a weighted sum of the plurality of received input waveforms.

In a fourth embodiment of the present invention, a method for finding the direction of a magnetic transmitter relative to a magnetic receiver is provided. The method includes receiving a magnetic communication signal with three mutually perpendicular antenna elements. The relative amplitudes of a plurality of received signals are measured, by, for example, generating a covariance matrix corresponding to the communication signal as received by each of the antenna elements. Principal components analysis may be applied to this matrix to estimate the magnitude and orientation of the magnetic field at the receiver antenna's position. The direction to the transmitter can then be determined from the field's orientation.

DETAILED DESCRIPTION

It is to be understood that the figures and descriptions of the present invention have been simplified to illustrate elements that are relevant for a clear understanding of the present invention, while eliminating, for purposes of clarity, many other elements found in typical magnetic communication systems, such as underground magnetic communication systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Multi-element antennas may be used in magnetic communication systems in order to improve received signal quality. However, current signal processing methods used with these antennas achieve only marginal improvements, as they only utilize data from the antenna element that outputs the strongest signal. These methods ignore benefits that may be realized by optimally combining the received signals from each antenna element, such as signal enhancement and noise cancellation, as will be set forth with respect to embodiments of the present invention.

Embodiments of the present invention may utilize a linear combination of waveforms received from a plurality of antenna elements to decrease noise and interference, increase signal strength, and improve the signal to noise ratio (SNR). In one embodiment, a received waveform from each antenna element may be associated with a weight determined through principal component analysis of waveforms from all antenna elements. The received waveforms contain communication signals as well as noise and interference. The associated weights are used to create a single waveform comprising the weighted sum of the individual received waveforms. The weights operate to improve the signal-to-noise ratio by canceling out much of the noise by correlating noise components from each of the antenna elements while preserving or enhancing the desired communication signal.

In another embodiment, weights are calculated through principal component analysis of received waveforms containing communication signals. By applying these weights, a single waveform comprising the weighted sum of the individual received waveforms may be generated. The communication signal in this waveform may be stronger than any individual signal received by any antenna element.

In another embodiment, weights are calculated through principal component analysis of received waveforms containing only noise and interference. By applying these weights, a single waveform comprising the weighted sum of the individual received waveforms may be generated. The noise and interference in this waveform may be weaker than in any individual waveform received by any antenna element.

In another embodiment of the present invention, a three-element (e.g. tri-axis) receiver can be used in direction finding operations to estimate the location of a transmitter, thus aiding, for example, rescue efforts. By using a tri-axis receiver in conjunction with the above-described signal processing techniques, estimates of the magnitude and orientation of the magnetic field at the receiver's position may be calculated. The direction to the transmitter may then be determined from the azimuth angle of the field's orientation.

Figure 1:
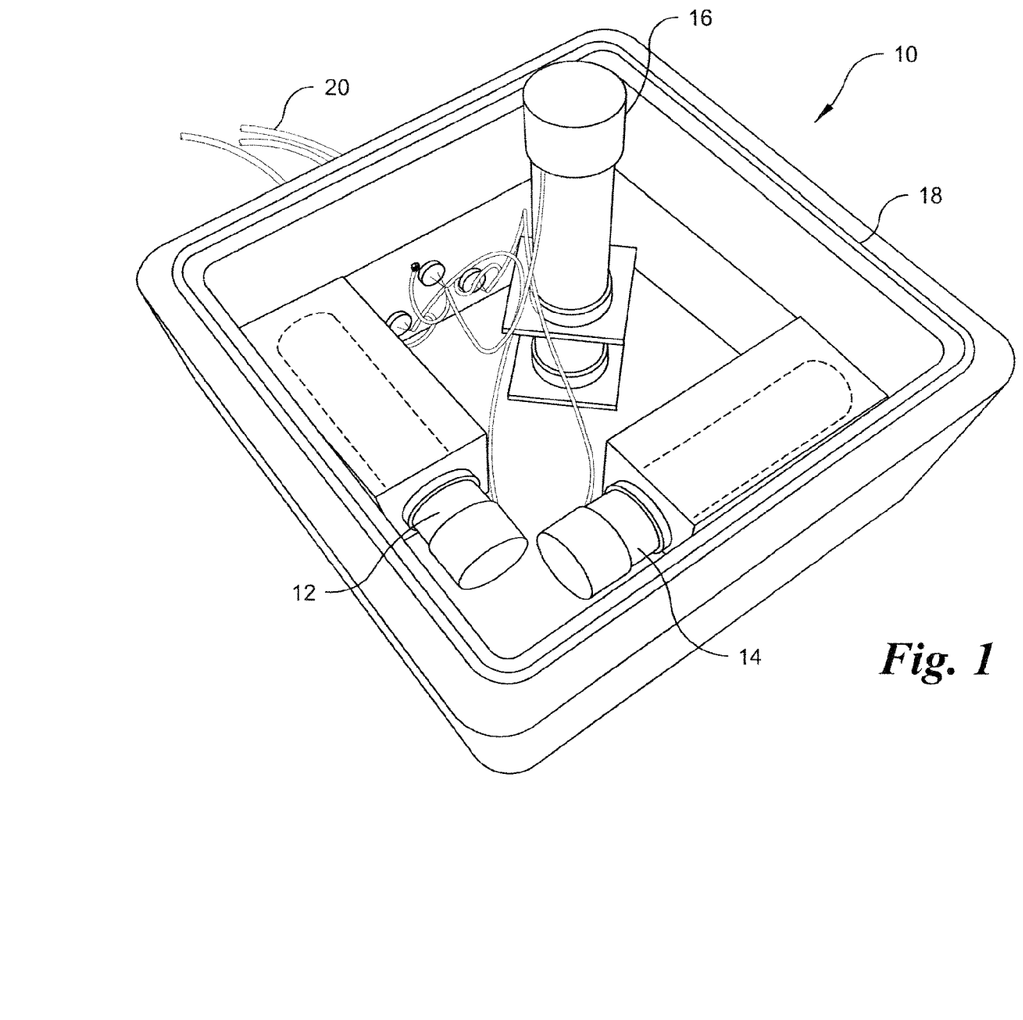
FIG. 1 is a perspective view of a tri-axis antenna according to an embodiment of the present invention.

Referring generally to FIG. 1, an exemplary multi-element antenna is shown. In the illustrated embodiment, antenna 10 comprises three antenna elements 12,14,16. Antenna elements 12,14,16 may be directional, such as ferrite rod elements, and operative to receive magnetic communication signals. In the exemplary embodiment, elements 12,14,16 are oriented generally orthogonally with respect to one another such that they may be considered oriented along respective x, y and z axes of a Cartesian coordinate system. Elements 12,14,16 may be co-located within a common enclosure 18, providing portability and protection thereto, and communicate via connections 20 to a signal processing system, the operation of which will be set forth in detail below. While elements 12,14,16 are shown co-located, as will be set forth in detail below, signal processing operations according to embodiments of the present invention may not require the co-location of elements 12,14,16, nor the specific orientation of each element with respect to one another (i.e. along respective axes). Moreover, the number of elements utilized may be altered without affecting the operation of the processes.

Each antenna element 12,14,16 has a directional response that is maximal when the magnetic field to be received is aligned with its axis and minimal when the field is perpendicular to its axis. Response to a signal, such as that from an emergency transponder or beacon, varies significantly depending on the orientation of antenna elements with respect to the magnetic field of the transmitted signal. Because elements 12,14,16 may not be optimally oriented with respect to a signal, their reception abilities may be adversely affected.

A first embodiment of the present invention may remedy these drawbacks by combining waveforms received from each of elements 12,14,16 and processing them jointly to derive a weighted signal representative of the signal source. Specifically, using digital signal processing algorithms, signals from each of elements 12,14,16 may be combined to effectively rotate the antenna electronically. This process maximizes the signal strength for further processing and analysis by the remaining portions of the communication system. As will be set forth in detail below, resulting weights from this technique may strike a balance between enhancing the signal and suppressing noise and interference, thus improving the resulting signal to noise ratio relative to any single antenna element. With respect to these embodiments as shown, for example, in FIGS. 2 and 3, a known orientation of each antenna element is not required, and any number of antenna elements may be used.

Figure 2:
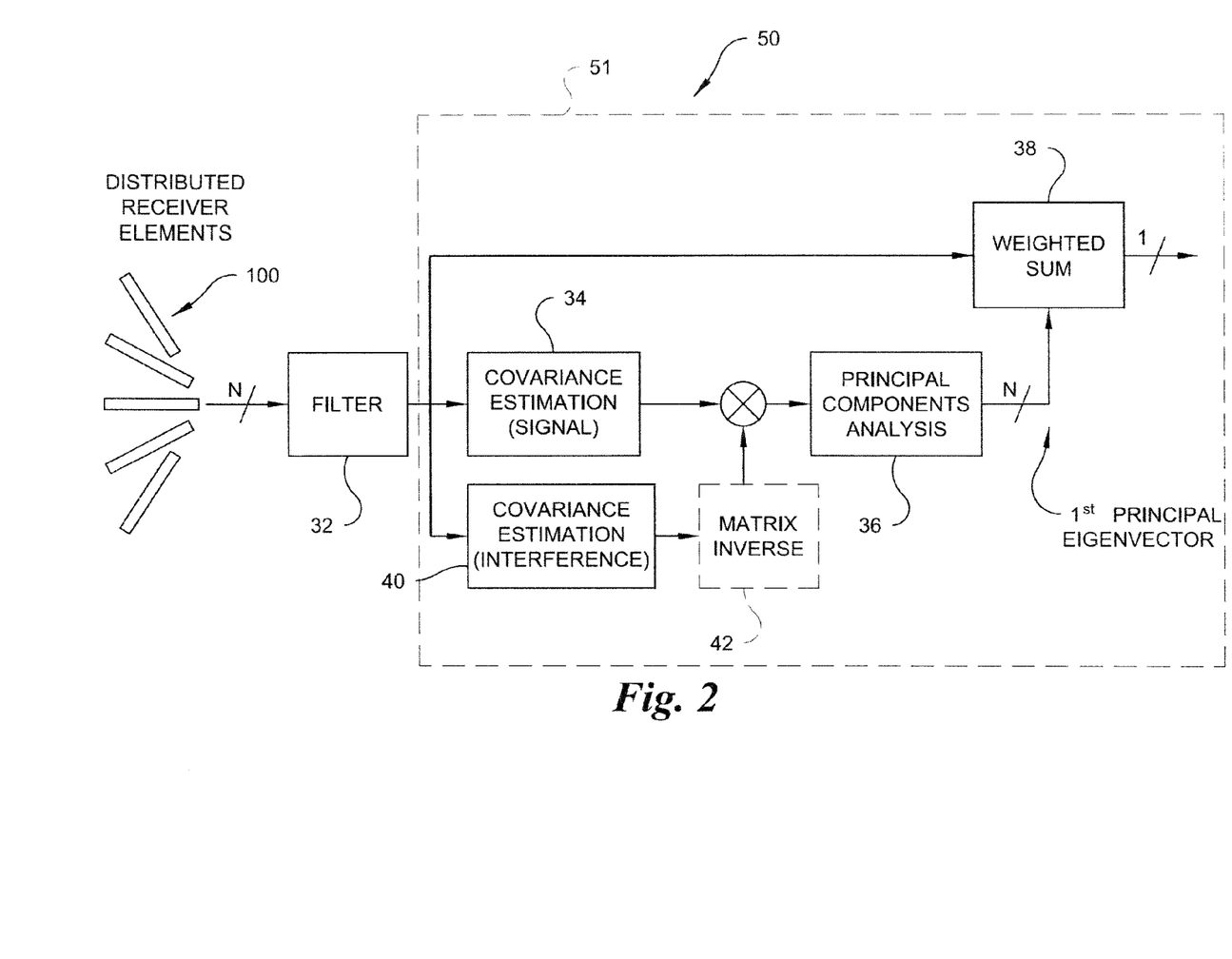
FIG. 2 is a process flow diagram illustrating the operation of the antenna of FIG. 1 used in a signal enhancement and interference suppression process.

Referring generally to FIG. 2, an exemplary embodiment of a signal processing method useful for enhancing a communication signal and suppressing interference received on a multi-element antenna is described. The input to communication system 50 is a vector $\vec{x}$ consisting of waveforms from each of antenna elements 1 through N of antenna 100:

$$\vec{x} = \begin{bmatrix} x_1 \\ x_2 \\ \vdots \\ x_N \end{bmatrix} \qquad \text{Eq. 1}$$

These waveforms are convolved with a filter 32, having a response h (Eq. 2), which is matched to the transmitted signal in order to eliminate noise and interference residing outside the frequency band of interest. A resulting vector $\vec{y}$ is produced, representing the filtered waveforms from each of the antenna elements 1 through N:

$$\vec{y} = h * \vec{x} \qquad \text{Eq. 2}$$

Input vector $\vec{y}$ is assumed to be a combination of a desired signal $\vec{s}$ and undesired interference and noise $\vec{n}$:

$$\vec{y} = \vec{s} + \vec{n}$$

It may be assumed that signal $\vec{s}$ and noise $\vec{n}$ are zero-mean and independent of each other so that a covariance matrix of the input $R_y$ is simply the sum of a signal covariance matrix $R_s$ and a noise covariance matrix $R_n$:

$$R_y \stackrel{def}{=} E(\vec{y}\vec{y}^H) \qquad \text{Eq. 4a}$$

$$= E((\vec{s}+\vec{n})(\vec{s}+\vec{n})^H) \qquad \text{Eq. 4b}$$

$$= E(\vec{s}\vec{s}^H + \vec{s}\vec{n}^H + \vec{n}\vec{s}^H + \vec{n}\vec{n}^H) \qquad \text{Eq. 4c}$$

$$= E(\vec{s}\vec{s}^H) + E(\vec{s}\vec{n}^H) + E(\vec{n}\vec{s}^H) + E(\vec{n}\vec{n}^H) \qquad \text{Eq. 4d}$$

$$= R_s + R_n \qquad \text{Eq. 4e}$$

Where $E(x)$ is the expected value of x and $\vec{y}^H$ is the conjugate transpose of the column vector $\vec{y}$. Embodiments of the present invention are operative to produce a set of weights $\vec{w}$ that maximizes the signal-to-noise ratio (SNR) in the scalar received signal r, which is a weighted sum of the elements of input vector $\vec{y}$:

$$r = \vec{w}^H \vec{y} \qquad \text{Eq. 5}$$

The power of the received signal is:

$$P_r = E(rr^*) \qquad \text{Eq. 6}$$

$$= E(\vec{w}^H \vec{y} \vec{y}^H \vec{w})$$

$$= \vec{w}^H E(\vec{y} \vec{y}^H) \vec{w}$$

$$= \vec{w}^H R_y \vec{w}$$

$$= \vec{w}^H R_s \vec{w} + \vec{w}^H R_n \vec{w}$$

$$= P_s + P_n$$

Where $r^*$ is the complex conjugate of the scalar r. The signal-to-noise ratio is then:

$$SNR = \frac{P_s}{P_n} \qquad \text{Eq. 7}$$

Maximizing the SNR is equivalent to maximizing the signal power while keeping the noise power constant. A Lagrange multiplier may be used to find weights $\vec{w}$ that maximize a function $f(\vec{w}) = P_s$ subject to a constraint $g(\vec{w}) = P_n - c = 0$:

$$\nabla f(\vec{w}) = \lambda \nabla g(\vec{w}) \qquad \text{Eq. 8a}$$

$$\nabla(\vec{w}^H R_s \vec{w}) = \lambda \nabla(\vec{w}^H R_n \vec{w} - c) \qquad \text{Eq. 8b}$$

$$R_s \vec{w} = \lambda R_n \vec{w} \qquad \text{Eq. 8c}$$

$$R_n^{-1} R_s \vec{w} = \lambda \vec{w} \qquad \text{Eq. 8d}$$

Where $\nabla$ is the gradient operator.

It should be noted that the form of the last expression comprises the definition of an eigenvector of the matrix $R_n^{-1} R_s$. Thus, the SNR is maximized when weights $\vec{w}$ are chosen that are proportional to eigenvector $\vec{q}_1$ corresponding to the largest eigenvalue $\lambda_1$ of matrix $R_n^{-1} R_s$:

$$(R_n^{-1} R_s)\vec{q}_1 = \lambda_1 \vec{q}_1 \qquad \text{Eq. 9}$$

$$\vec{w} = \frac{\vec{q}_1}{\|\vec{q}_1\|} \qquad \text{Eq. 10}$$

As set forth above, and still referring to FIG. 2, a set of weights corresponding to the number of antenna elements are calculated to form a linear combination of the input waveforms that maximizes the SNR. This process assumes that estimates of signal-only covariance matrix $R_s$ and interference-only covariance matrix $R_n$ are available from measurements, and that eigenvector $\vec{q}_1$ corresponding to the largest eigenvalue $\lambda_1$ can be determined by applying principal components analysis to the matrix $R_n^{-1} R_s$.

As previously set forth in Eq. 4a, covariance matrix $R_y$ is defined as follows:

$$R_y \stackrel{Def}{=} E(\vec{y}\vec{y}^H) = \begin{bmatrix} E(y_1 y_1^*) & \cdots & E(y_1 y_N^*) \\ \vdots & \ddots & \vdots \\ E(y_N y_1^*) & \cdots & E(y_N y_N^*) \end{bmatrix} \qquad \text{Eq. 4a}$$

This covariance matrix may be computed at step 34 and/or step 40 of FIG. 2 by any number of approximation techniques that replace the expected value operation with an average. The covariance matrix $R_y$ may be approximated using an instantaneous value $\hat{R}_k$ at time instant k:

$$\hat{R}_k = \vec{y}_k \vec{y}_k^H \qquad \text{Eq. 11}$$

Alternatively, $R_y$ may be approximated using an exponentially weighted moving average taking the form:

$$\hat{R}_k = \alpha \vec{y}_k \vec{y}_k^H + (1-\alpha)\hat{R}_{k-1} \qquad \text{Eq. 12}$$

In yet another embodiment, $R_y$ may be approximated using an average over a block of M samples:

$$\hat{R} = \frac{1}{M} \sum_{k=1}^{M} \vec{y}_k \vec{y}_k^H \qquad \text{Eq. 13}$$

In order to achieve noise and interference suppression, the covariance matrix of the received noise and interference $R_n$ is estimated in step 40 by averaging the input $\vec{y}$ when the desired communication data is known to be absent from the received signal. It is envisioned that several methods may be employed to ensure that the desired signal is absent when making this estimation.

In one embodiment, the input $\vec{y}$ may be sampled when the desired signal is known to be absent, such as during a predetermined silent interval or a silent interval that is part of a collision avoidance protocol. A second method of estimating the covariance of the interference $R_n$ uses only samples of the input $\vec{y}$ with amplitude exceeding a predetermined threshold. This method assumes that the amplitude of the interference significantly exceeds that of the desired signal. A third method of estimating the covariance of interference $R_n$ detects the presence of the desired signal, estimates a waveform representative thereof, and subtracts the waveform from the input $\vec{y}$. The result of this subtraction will be comprised primarily of interference. A fourth method of estimating the covariance of interference $R_n$ includes using a frequency-selective filter to attenuate the desired signal. The resulting filtered waveform will be out of band interference used to model the in-band interference. This method assumes that the covariance of out of band interference is similar to the covariance of the in-band interference.

Still referring to step 34, the covariance matrix of the desired signal $R_s$ may be estimated by averaging the filtered input $\vec{y}$ when the signal is present. As a result of the accompanying noise and interference, $R_y \neq R_s$. However, if the noise and interference are independent of the desired signal, then:

$$R_s = R_y - R_n. \quad \text{Eq. 14}$$

Thus, if the interference is slowly varying, an estimate of $R_s$ can be obtained by subtracting a previous estimate of $R_n$ from the current estimate of $R_y$.

In another embodiment of the present invention, $R_s$ may be estimated by providing a long-duration single-frequency pulse. A filter matched to the pulse may be provided to improve the SNR of the received signal. As the SNR rises, the received signal covariance $R_y$ approaches the ideal signal-only covariance $R_s$. The use of the sinusoid as a training signal is acceptable as the system is only responsive to spatial information regarding the transmitter, and not details of the signal.

In another embodiment, each communication system transmits a periodic training signal (e.g., with a period on the order of one minute, or at a rate consistent with changes to the interference environment) that would consist of one second, for example, of a sinusoid followed by one second of silence. The training signal would be match filtered to generate $R_s$ and the silent period would be sampled to generate $R_n$. Various communication systems may utilize synchronized clocks so that every system would agree on the absolute times at which each system transmits its training pulses. If the training pulses occur at a low enough rate there would be no significant impact on normal communication.

Once signal covariance $R_s$ and noise and interference covariance $R_n$ have been estimated in step 34 and step 40 of FIG. 2, they are combined to form a new matrix A:

$$A = R_n^{-1} R_s \quad \text{Eq. 15}$$

and the eigenvector $\vec{q}_1$ corresponding to the largest eigenvalue $\lambda_1$ of matrix A may be calculated in step 36.

$$A\vec{q}_1 = \lambda \vec{q}_1 \quad \text{Eq. 16}$$

From matrix A, an eigenvector $\vec{q}_1$ corresponding to the largest eigenvalue $\lambda_1$ of the matrix (e.g. the 1$^{st}$ principal eigenvector) may be calculated. As will be understood by one of ordinary skill in the art, computing eigenvector $\vec{q}_1$ can be accomplished by any number of techniques, such as principal components analysis or the power method.

Principal component analysis may include finding the largest diagonal element of A and selecting the corresponding column as an approximation of the eigenvector $\vec{q}_1$. This is equivalent to a single step of the power method with an initial unit vector. Alternatively, a variation of the power method using an exponentially weighted moving average taking the following form may be utilized:

$$\hat{q}_k = \alpha A \hat{q}_{k-1} + (1-\alpha) \hat{q}_{k-1} \quad \text{Eq. 17}$$

This vector may be normalized periodically to prevent numeric overflow or underflow in the processing system.

A weight vector proportional to the resulting eigenvector $\vec{q}_1$ is applied to the input signal to produce a scalar output in step 38:

$$\vec{w} = \frac{\vec{q}_1}{\|\vec{q}_1\|} \quad \text{Eq. 18}$$

$$r = \vec{w}^H \vec{y} \quad \text{Eq. 19}$$

The resulting scalar waveform r will have an improved SNR relative to the original received signal and can be used as the input to a demodulator of a communication system receiver for further processing and/or analysis.

Figure 5A:
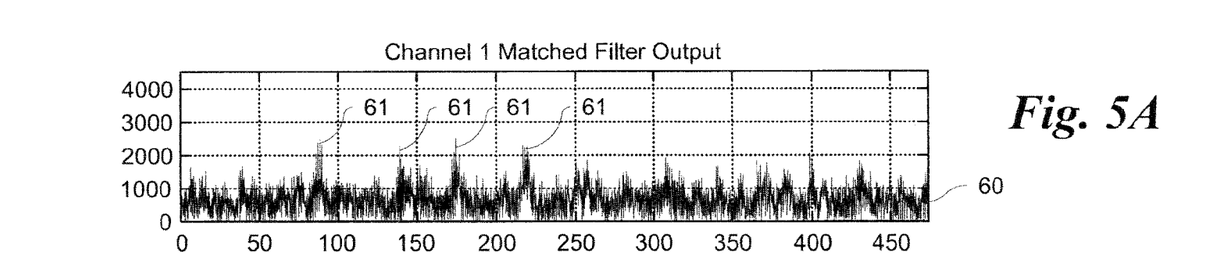
FIGS. 5A-5C are graphs showing the resulting combination of two received signals according to embodiments of the present invention.
Figure 5B:
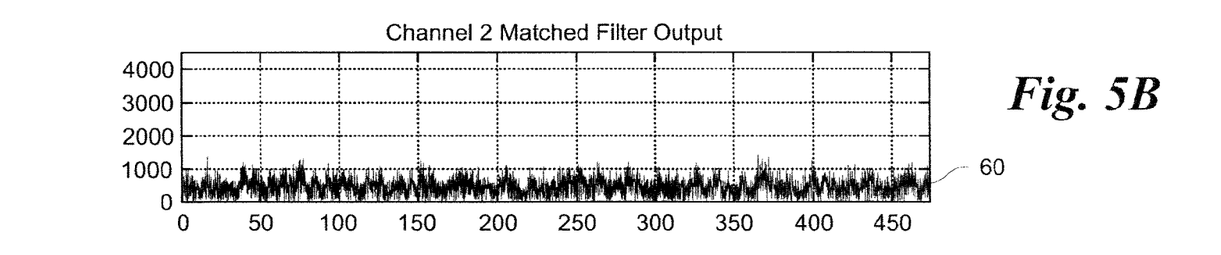
Figure 5C:
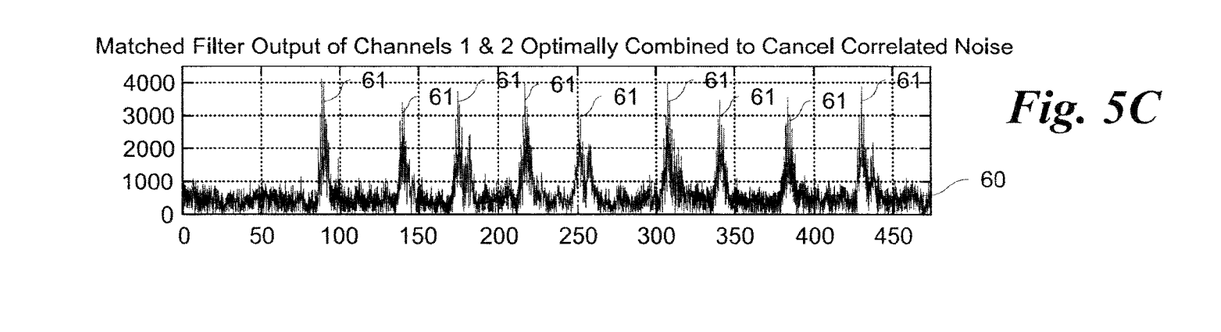

Referring generally to FIGS. 5A-5C, the benefits of optimally combining multiple receive channels are described. Referring to FIG. 5A, the received, measured signal from a single antenna element is shown, for example, the received signal with respect to antenna element 12 in FIG. 1. Note the presence of approximately four distinct messages or excitations 61 in the received signal 60. Referring to FIG. 5B, the same signal 60 is shown as received by a second antenna element, for example antenna element 14 in FIG. 1. It should be noted that this signal shows no recognizable messages or excitations, despite being identical to that shown in FIG. 5A. As set forth above, this discrepancy may be the result of several factors, including the relative orientation of the receiving element and the transmitter. Referring to FIG. 5C, optimally combining the two channels of FIGS. 5A and 5B according to the embodiments described above with respect to FIG. 2 brings out nine distinct messages 61 that now can be demodulated.

Figure 6A:
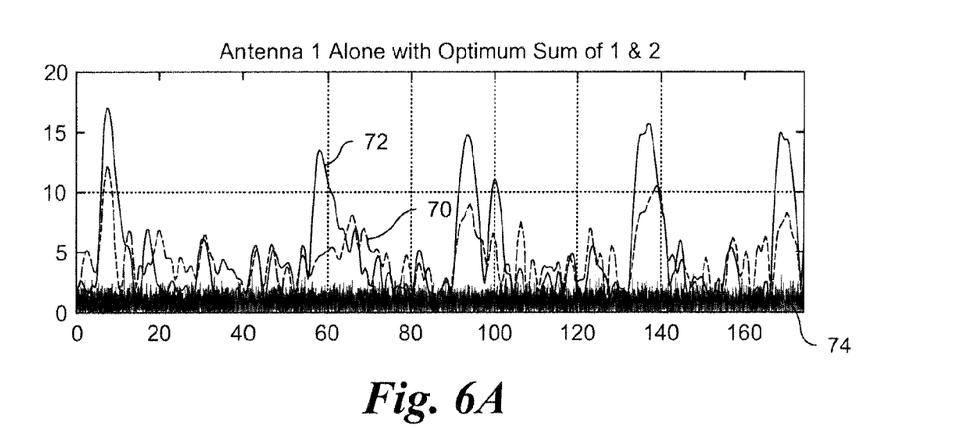
FIGS. 6A and 6B are graphs showing the resulting combination of two received signals according to embodiments of the present invention.
Figure 6B:
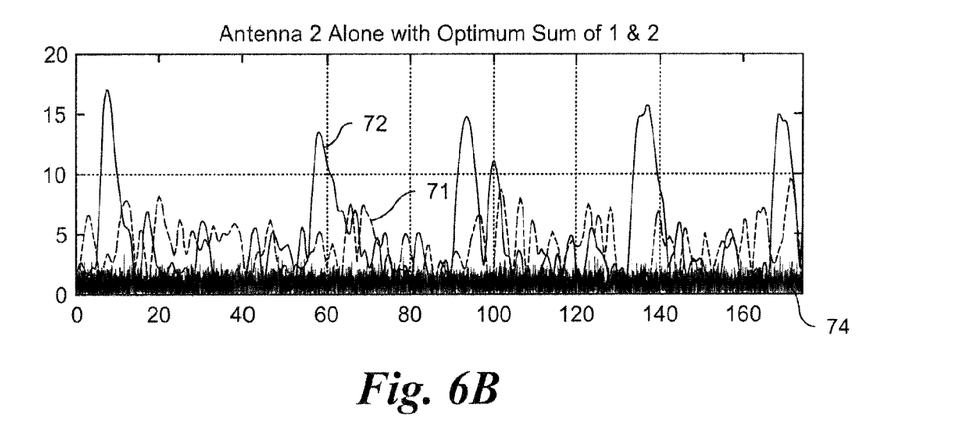

Similarly, referring to FIGS. 6A and 6B, results of another embodiment of the present invention using an antenna comprising two elements is shown. Specifically, FIG. 6A shows a received signal 70 from a first of the two antenna elements. Using the above-described method of, for example, FIG. 2, a resulting enhanced signal 72 is generated, and a corresponding increase in the signal to noise ratio (SNR) 74 between 3.0 and 9.5 dB is realized. FIG. 6B shows the same optimized signal 72 with the signal 71 received from a second of the two antenna elements.

Figure 3:
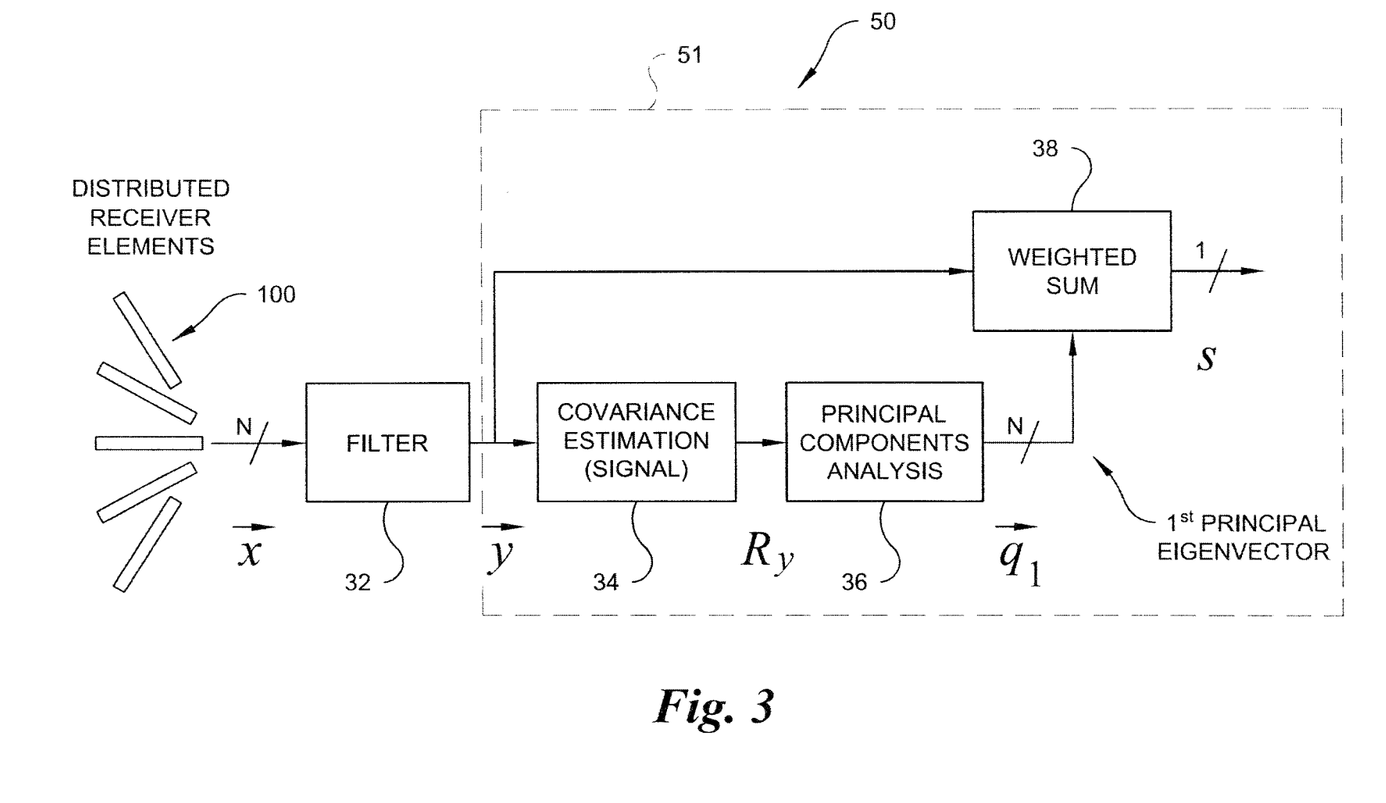
FIG. 3 is a process flow diagram illustrating the operation of the antenna of FIG. 1 used to enhance a received signal.

Referring generally to FIG. 3, a second embodiment of the present invention maximizes the strength of the communication signal instead of maximizing the SNR. The method includes similar steps to those described above with respect to FIG. 2, including receiving of a communications waveform with a plurality of antenna elements 100, filtering the signal (step 32), and generating a covariance matrix of the signal portion of the received waveform (step 34). An output signal may be generated by performing principal components analysis (step 36) to find the principal eigenvector $\vec{q}_1$ of the matrix:

$$A = R_s \quad \text{Eq. 20}$$

with weights calculated and applied (step 38) as described in the first embodiment of the present invention.

A third embodiment of the present invention minimizes the noise and interference instead of maximizing the SNR. This is accomplished by performing principal components analysis to find the principal eigenvector $\vec{q}_1$ of the matrix $$A = R_n^{-1} \quad \text{Eq. 21}$$

with weights calculated and applied as described in the first embodiment of the present invention.

Figure 4:
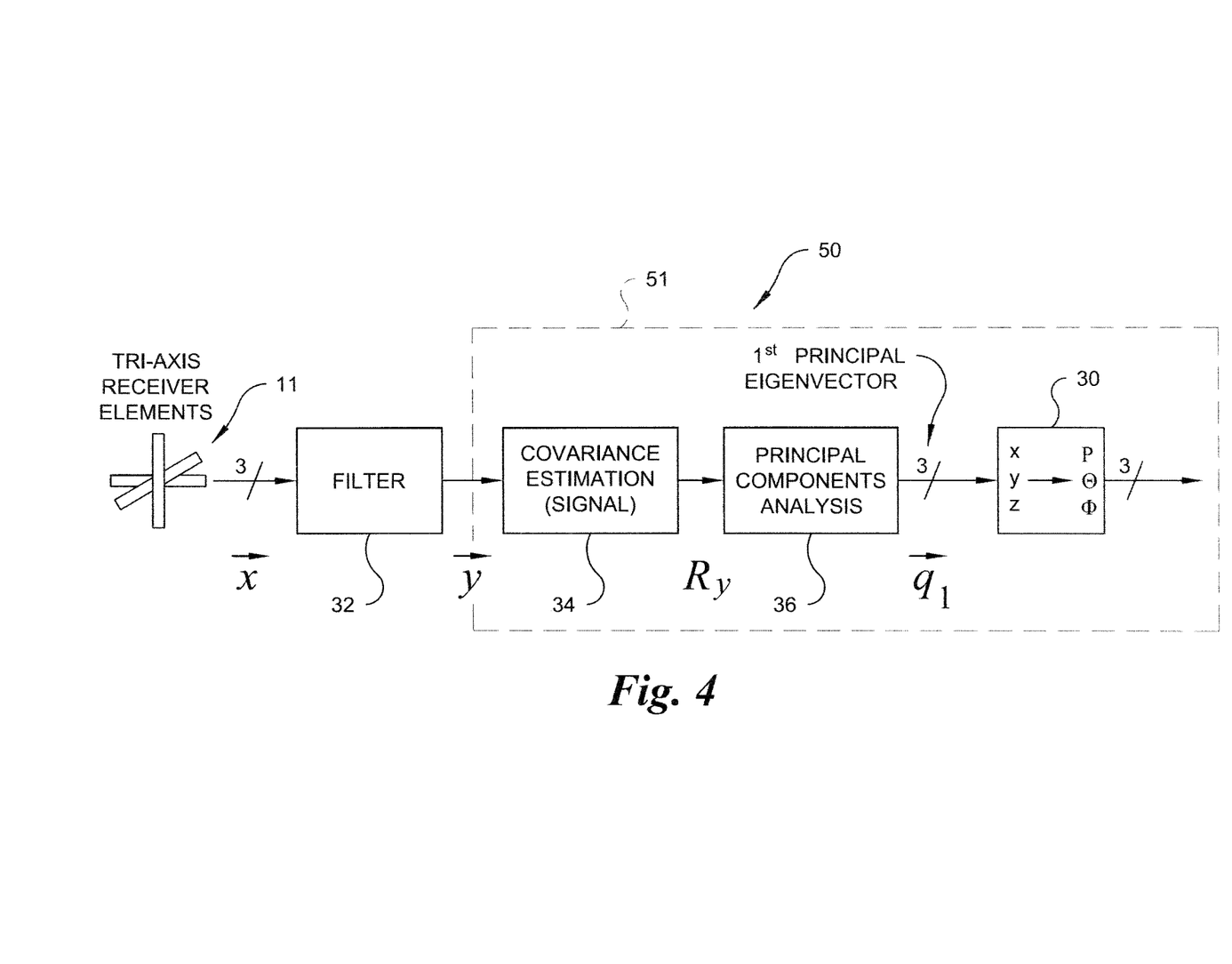
FIG. 4 is a process flow diagram illustrating the operation of the antenna of FIG. 1 used to perform a direction finding process.

Referring generally to FIG. 4, a fourth embodiment of the present invention estimates the direction of a magnetic transmitter relative to a magnetic receiver using portions of the above-described techniques on a tri-axis antenna 11, such as antenna 10 in FIG. 1. Direction finding operations require that the antenna elements are positioned with known orientations, for example, perpendicular to one another. In the illustrated embodiment of FIG. 1, each of the antenna elements is identical, however, these elements may be distinct from one another, and a correction factor be implemented to correct for these variations. It may be advantageous for antenna elements used in a direction finding operation to be co-located, for example, within a few inches of one another.

Direction finding operations may include the steps described above with respect to FIG. 3, including filtering in step 32, the derivation of a covariance matrix $R_s$ in step 34, and the computation of weights $\vec{w}$ proportional to the eigenvector $\vec{q}_1$ in step 36 corresponding to the largest eigenvalue $\lambda_1$ of the covariance matrix $R_y$.

From the weights, the general bearing 30 of the transmitted signal can be estimated. In particular, the x, y, and z components of the weight vector $\vec{w}$ are converted from Cartesian coordinates to spherical coordinates to obtain azimuth and elevation angles θ and φ, with:

$$\rho = \sqrt{x^2 + y^2 + z^2}$$ Eq. 22

$$\theta = \tan^{-1}\left(\frac{y}{x}\right)$$ Eq. 23

$$\phi = \sin^{-1}\left(\frac{z}{\rho}\right)$$ Eq. 24

The source of the magnetic transmission lies along a line of bearing indicated by the estimated azimuth angle θ. In one embodiment of the present invention, measurements may be made by multiple receivers at varying locations, or multiple measurements by a single receiver at multiple positions. In this way, triangulation can be used to estimate the position of the transmitter.

In any of the above-described embodiments, it should be understood that the signal processing described herein may be implemented by known digital signal processing (DSP) techniques and associated hardware. For example, a processor 51 (FIGS. 2-4) may be provided, responsive to the inputs from each of the plurality of antennas 100,11 and programmed to perform the desired operations. It should also be understood that additional elements, by way of example only, DAC/ADC converters, filters, memory devices for storing instructions to execute the above-described processes, and additional processors have been excluded from the figures for the purpose of simplicity, however, may also be implemented into a suitable signal processing device operative to perform in the described manner. Other embodiments for implementing the signal enhancement, noise reduction, and direction finding processes described herein may be contemplated by one of skill in the pertinent art without departing from the intended scope of this disclosure. For example, the process has been explained by way of example, to include memory containing instructions, the instructions when executed by a processor, cause the steps of a method for cancelling impulse interference during signal processing to be performed. It is understood that the process of interference cancellation may also be performed in hardware, for example in a field programmable gate array (FPGA) or a complex programmable logic device (CPLD). Thus, the whole process or any part thereof, may be performed in hardware, software or any combination of hardware and/or software. Software may be embodied in a non-transitory machine readable medium upon which software instructions may be stored, the stored instructions when executed by a processor cause the processor to perform the signal processing. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A method for enhancing a magnetic communication signal, the method including the steps of: receiving a magnetic communication signal having an amplitude containing magnetic communication data and interference via a plurality of antenna elements; measuring the relative amplitudes of the magnetic communication plurality of received signals from each antenna element; measuring interference contained in a plurality of signals received from each antenna element over a time interval in which the magnetic communication data is absent from the plurality signals receive from each antenna; calculating a plurality of weights indicative of the measured amplitudes and the measured interference, and generating a weighted sum of the magnetic communication received signals received from each antenna element using the calculated weights.

2. The method of claim 1, wherein the step of measuring the relative amplitudes of the plurality of received signals comprises measuring a covariance of the plurality of received signals from each antenna element.

3. The method of claim 2, wherein the step of measuring the covariance of the received signals comprises generating a covariance matrix from the received signals.

4. The method of claim 3, wherein the step of calculating a plurality of weights comprises calculating an eigenvector corresponding to a largest eigenvalue of the generated covariance matrix.

5. The method of claim 4, wherein the eigenvector is calculated through principal component analysis of the generated covariance matrix.

6. The method of claim 5, further comprising the step of calculating a bearing representing a direction of the received signal.

7. The method of claim 6, wherein the bearing is calculated by generating azimuth and elevation angles from the eigenvector.

8. The method of claim 1, wherein the weighted sum is formed by calculating an inner product of the weights and a vector representing a received input signals.

9. The method of claim 1, wherein the step of measuring interference comprises the step of calculating the covariance of a portion of the signal generally comprising only interference.

10. The method of claim 9, wherein the step of calculating the covariance of interference comprises calculating the covariance of the input at frequencies where the desired communication signal is absent.

11. The method of claim 9, wherein the step of calculating the covariance of interference includes sampling portions of the input having an amplitude exceeding a predetermined threshold.

12. The method of claim 9, wherein the step of calculating the covariance of interference comprises calculating the covariance of the input from which the desired communication signal has been subtracted.

13. The method of claim 9, wherein the step of calculating the covariance of interference comprises generating a second covariance matrix for the received interference.

14. The method of claim 13, wherein the step of calculating a plurality of weights comprises calculating an eigenvector corresponding to the largest eigenvalue of the product of the inverse of the interference covariance matrix and the signal covariance matrix.

15. The method of claim 14, wherein the eigenvector is calculated through principal component analysis of the a calculated matrix product.

16. The method of claim 1, further comprising the step of filtering the received signals from each of the plurality of antenna elements.

17. A signal processing system comprising: a plurality of antenna elements configured to receive a magnetic communication signal having an amplitude containing magnetic communication data and interference; a processor configured to receive a plurality of signals from the antenna elements, wherein the processor is operative measure the relative amplitudes of a plurality of received signals from each antenna element, measure interference contained in a plurality of received signals from each antenna element, calculate a plurality of weights indicative of the measured amplitudes and measured interference, and generate a weighted sum of the received signals; wherein the interference is measured over a time interval in which the magnetic communication data is absent from the plurality signals receive from each antenna.

18. A direction finding system comprising: a plurality of antenna elements configured to receive a magnetic communication signal having an amplitude containing magnetic communication data and interference; a processor configured to receive a plurality of signals from the antenna elements, wherein the processor is operative to calculate a covariance of the received plurality of signals, and generate a vector indicative of an estimated direction and magnitude of the received signals from the calculated covariance, and wherein the calculated covariance includes the covariance of interference contained in a plurality of received signals measured over a time interval in which the magnetic communication data is absent from the plurality signals receive from each antenna.

19. A method of determining a direction of a transmitter relative to a receive, the method including the steps of: receiving a magnetic communication signal having an amplitude containing magnetic communication data and interference via a plurality of antenna elements; measuring the relative amplitudes of the magnetic communication signal received from each antenna element; measuring interference contained in a plurality of signals received from each antenna element over a time interval in which the magnetic communication data is absent from the plurality signals receive from each antenna; calculating a plurality of weights indicative of the measured amplitudes and the measured interference; and estimating the magnitude and orientation of the magnetic signal at the receiver relative to the transmitter.

20. A method for enhancing a magnetic communication signal, the method including the steps of: receiving a magnetic communication signal having an amplitude containing magnetic communication data and interference via a plurality of antenna elements; measuring the relative amplitudes of the magnetic communication signal received from each antenna element; measuring frequency-dependent interference contained in a portion of the received signal; calculating a plurality of weights indicative of the measured amplitudes and measured frequency-dependent interference; and generating a weighted sum of the received signals using the calculated weights.

21. The method of claim 1, wherein the measured interference is frequency-dependent interference.

* * * * *

UNITED STATES PATENT AND TRADEMARK OFFICE
CERTIFICATE OF CORRECTION

| | | |
|---|---|---|
| PATENT NO. | : 8,577,298 B2 | Page 1 of 1 |
| APPLICATION NO. | : 13/164375 | |
| DATED | : November 5, 2013 | |
| INVENTOR(S) | : Thomas M. Parks, Richard Wasiewicz and David LeVan | |

It is certified that error appears in the above-identified patent and that said Letters Patent is hereby corrected as shown below:

In the Claims:

Claim 1, column 10, line 58 insert --of-- between "plurality" and "signals"; replace "receive" with "received" so that column 10, line 58 reads "absent from the plurality of signals received from each antenna;"

Claim 8, column 11, line 19 delete "a" between "representing" and "received" so that column 11, line 19 reads "vector representing received input signals."

Claim 17, column 12, line 10 insert --of-- between "plurality" and "signals"; replace "receive" with "received" so that column 12, line 10 reads "absent from the plurality of signals received from each antenna."

Claim 18, column 12, line 23 insert --of-- between "plurality" and "signals"; replace "receive" with "received" so that column 12, line 23 reads "absent from the plurality of signals received from each antenna."

Claim 19, column 12, line 33 insert --of-- between "plurality" and "signals"; replace "receive" with "received" so that column 12, line 33 reads "communication data is absent from the plurality of signals received from"

Signed and Sealed this
Twenty-fifth Day of February, 2014

Michelle K. Lee
*Deputy Director of the United States Patent and Trademark Office*